(12) United States Patent
Masuzawa et al.

(10) Patent No.: US 10,928,606 B2
(45) Date of Patent: Feb. 23, 2021

(54) LENS UNIT

(71) Applicant: TIANJIN OFILM OPTO ELECTRONICS CO., LTD., Tianjin (CN)

(72) Inventors: Tomonari Masuzawa, Saitama (JP); Daiki Yoshida, Saitama (JP); Kensuke Masui, Saitama (JP)

(73) Assignee: TIANJIN OFILM OPTO ELECTRONICS CO., LTD., Tianjin (CN)

( * ) Notice: Subject to any disclaimer, the term of this patent is extended or adjusted under 35 U.S.C. 154(b) by 225 days.

(21) Appl. No.: 16/087,322

(22) PCT Filed: Mar. 9, 2017

(86) PCT No.: PCT/JP2017/009626
§ 371 (c)(1),
(2) Date: Dec. 4, 2018

(87) PCT Pub. No.: WO2017/163920
PCT Pub. Date: Sep. 28, 2017

(65) Prior Publication Data
US 2019/0101718 A1 Apr. 4, 2019

(30) Foreign Application Priority Data
Mar. 23, 2016 (JP) .............................. JP2016-059088

(51) Int. Cl.
*G02B 7/02* (2006.01)
*B60R 25/30* (2013.01)
(Continued)

(52) U.S. Cl.
CPC .............. *G02B 7/021* (2013.01); *B29D 11/00* (2013.01); *B29D 11/00403* (2013.01);
(Continued)

(58) Field of Classification Search
CPC ........ G02B 7/021; G02B 7/022; G02B 7/026; G02B 7/02; B29D 11/00; B29D 11/00403;
(Continued)

(56) References Cited

U.S. PATENT DOCUMENTS

| | | | | |
|---|---|---|---|---|
| 2007/0268470 | A1* | 11/2007 | Shibazaki | G02B 7/02 355/53 |
| 2010/0140459 | A1* | 6/2010 | Tatsuzawa | G02B 7/021 250/216 |
| 2015/0323708 | A1* | 11/2015 | Hashimoto | G02B 7/02 359/718 |

FOREIGN PATENT DOCUMENTS

| | | |
|---|---|---|
| JP | 58-087505 A | 5/1983 |
| JP | 59-154409 A | 9/1984 |

(Continued)

OTHER PUBLICATIONS

International Search Report for PCT/JP2017/009626 dated Jun. 6, 2017 [PCT/ISA/210].

(Continued)

*Primary Examiner* — Marin Pichler
(74) *Attorney, Agent, or Firm* — Hodgson Russ LLP

(57) ABSTRACT

A lens unit is provided that includes: a first lens that is housed inside a lens-barrel, the first lens including a first lens section and a first flange section that juts out from the first lens section in a direction orthogonal to an optical axis direction; a second lens that is housed inside the lens-barrel further toward an imaging plane side than the first lens, the second lens including a second lens section and a second flange section that juts out from the second lens section in a direction orthogonal to the optical axis direction; and a spacing ring that is sandwiched between the first lens and the second lens and that defines a spacing between the first lens and the second lens, the spacing ring includes a main body (Continued)

disposed between the first flange section and the second flange section in the optical axis direction, first protrusion portions that protrude in the optical axis direction from an object side of the main body, and second protrusion portions that protrude in the optical axis direction from the imaging plane side of the main body and are disposed offset with respect to the first protrusion portions when projected along the optical axis direction.

8 Claims, 13 Drawing Sheets

(51) Int. Cl.
　　　*H04N 5/225*　　　(2006.01)
　　　*B29D 11/00*　　　(2006.01)
(52) U.S. Cl.
　　　CPC .............. *B60R 25/305* (2013.01); *G02B 7/02* (2013.01); *G02B 7/022* (2013.01); *G02B 7/026* (2013.01); *H04N 5/2254* (2013.01); *B29D 11/00932* (2013.01)

(58) Field of Classification Search
　　　CPC ........ B29D 11/00413; B29D 11/00932; H04N 5/2254
　　　USPC ......................................... 359/819, 821, 830
　　　See application file for complete search history.

(56) References Cited

FOREIGN PATENT DOCUMENTS

| | | |
|---|---|---|
| JP | 61-105519 A | 5/1986 |
| JP | 2000-206386 A | 7/2000 |
| JP | 2003-015005 A | 1/2003 |
| JP | 2005-010371 A | 1/2005 |
| JP | 2009-210693 A | 9/2009 |

OTHER PUBLICATIONS

Written Opinion for PCT/JP2017/009626 dated Jun. 6, 2017 [PCT/ISA/237].

International Preliminary Report on Patentability for PCT/JP2017/009626 dated Nov. 21, 2017 [PCT/IPEA/409].

* cited by examiner

LENS UNIT

CROSS-REFERENCE TO RELATED APPLICATIONS

This application claims priority under 35 USC 119 from International Application PCT/JP2017/009626 filed on Mar. 9, 2017, and Japanese Patent Application No. 2016-059088 filed on Mar. 23, 2016, the disclosures of which are incorporated herein by reference in its entirety.

The present disclosure relates to a lens unit.

BACKGROUND ART

Examples of lens units configured by plural lenses housed in a single lens-barrel are the lens units described in Japanese Patent Application Laid-Open (JP-A) Nos. 2009-210693 and S61-105519.

A lens unit of JP-A No. 2009-210693 has protrusion portions formed so as to protrude toward both an object side and an imaging plane side in an optical axis direction, the protrusion portions being provided at the same position in a circumferential direction of a ring shaped positioning member linking a lens to a holding ring.

A lens unit of JP-A No. S61-105519 has protrusion portions formed on top and bottom faces of a spacing ring to engage with beveled faces of a lens.

SUMMARY OF INVENTION

Technical Problem

In the lens unit of JP-A No. S61-105519, due to contact being between the beveled faces of the lens and the inside edges of the spacing ring, compression force acting on the spacing ring when the lens has expanded on heating is broken down into component forces so that the spacing ring is not easily compressed in the optical axis direction.

There are also lenses that include a lens section through which light passes, and a flange section that juts out from the lens section in a direction intersecting with the optical axis direction. However, when the positioning member of JP-A No. 2009-210693 is provided in a lens unit including a lens equipped with a flange section, the flange section of the lens and the protrusion portions of the positioning member would make contact with each other in the optical axis direction. Thus, force acting along the optical axis direction would be less readily dispersed than in the configuration of JP-A No. S61-105519, and the spacing ring would easily be compressed.

In a lens unit having a spacing ring provided with protrusion portions disposed between two lenses, the lenses expand in the optical axis direction when the external temperature of the lens unit is raised. A compression force accordingly acts on the spacing ring along the optical axis direction due to the lenses expanding in the optical axis direction, with the possibility arising that the protrusion portions deform plastically. Moreover, when the protrusion portions of the spacing ring have plastically deformed, the spacing between the two lenses in the optical axis direction is reduced from a set spacing.

In consideration of the above circumstances, the present disclosure provides a lens unit capable of suppressing a reduction in spacing between a first lens and a second lens from the set spacing, compared to configurations in which first protrusion portions and second protrusion portions of a spacing ring are sandwiched between the first lens, and the second lens are arranged in a row along the optical axis direction.

Solution to Problem

A lens unit according to a first aspect of the present disclosure includes a first lens that is housed inside a lens-barrel, the first lens including a first lens section and a first flange section that juts out from the first lens section in a direction orthogonal to an optical axis direction; a second lens that is housed inside the lens-barrel further toward an imaging plane side than the first lens, the second lens including a second lens section and a second flange section that juts out from the second lens section in a direction orthogonal to the optical axis direction; and a spacing ring that is sandwiched between the first lens and the second lens and that defines a spacing between the first lens and the second lens, the spacing ring including a main body disposed between the first flange section and the second flange section in the optical axis direction, plural first protrusion portions that protrude in the optical axis direction from an object side of the main body, and plural second protrusion portions that protrude in the optical axis direction from the imaging plane side of the main body and are disposed offset with respect to the first protrusion portions when projected along the optical axis direction.

In the lens unit according to the first aspect, the first lens, the spacing ring, and the second lens are housed inside the lens-barrel, in this sequence from the object side. On the spacing ring, the first protrusion portions protrude from the object side of the main body, and the second protrusion portion protrude from the imaging face side of the main body. The spacing ring is sandwiched between the first lens and the second lens and defines the spacing between the first lens and the second lens.

In the lens unit according to the first aspect, the first lens and the second lens expand when the first lens and the second lens are heated by a rise in the external temperature of the lens unit. The expansion of the first lens and the second lens in the optical axis direction is restricted by the lens-barrel, and a compression force acts on the spacing ring in the optical axis direction. In the spacing ring, the first protrusion portions and the second protrusion portions are offset from each other when seen in a projected state along the optical axis direction. Compression force acting on the first protrusion portions from the first lens accordingly less readily acts on the second protrusion portions, and compression force acting on the second protrusion portion from the second lens less readily acts on the first protrusion portions, than in configurations in which the first protrusion portions and the second protrusion portions are aligned along the optical axis direction.

The first protrusion portions and the second protrusion portions are accordingly not easily deformed due to the first protrusion portions and the second protrusion portions not being easily compressed in the optical axis direction even when the first lens and the second lens expand. Namely, in the lens unit, due to the first protrusion portions and the second protrusion portions not being easily deformed, the spacing between the first lens and the second lens may be suppressed from being reduced from a set spacing, compared to configurations in which the first protrusion portions and the second protrusion portions are aligned along the optical axis direction.

In a lens unit according to a second aspect of the present disclosure, at least one of the first lens or the second lens is made from resin.

In the lens unit according to the second aspect, due to the at least one of the first lens or the second lens being made from resin, the thermal expansion coefficient of the at least one of the first lens or the second lens is larger than configurations in which the first lens and the second lens are made from glass. The compression force acting on the spacing ring in the optical axis direction is accordingly larger due to the larger thermal expansion coefficient of the at least one of the first lens or the second lens. However, the first protrusion portions and the second protrusion portions do not easily deform due to the first protrusion portions and the second protrusion portions not being respectively aligned along the optical axis direction. Namely, in the lens unit, due to the first protrusion portions and the second protrusion portions not being easily deformed, the spacing between the first lens and the second lens may be suppressed from being reduced from the set spacing, even when at least one of the first protrusion portions or the second protrusion portions is made from resin.

In a lens unit according to a third aspect of the present disclosure, the first protrusion portions and the second protrusion portions are disposed offset with each other in a circumferential direction of the main body when projected along the optical axis direction.

In the lens unit according to the third aspect, the spacing ring is longer in length in the circumferential direction than its width in the radial direction when viewed along the optical axis direction. Namely, offsetting the first protrusion portions and the second protrusion portions from each other in the circumferential direction enables the spacing between the first protrusion portions and the second protrusion portions to be wider when projected along the optical axis direction than configurations in which the first protrusion portions and the second protrusion portions are offset from each other in the radial direction.

By widening the spacing between the first protrusion portions and the second protrusion portions, compression force may be absorbed by bending elastic force of the main body of the spacing ring, such that the first protrusion portions and the second protrusion portions are not easily deformed. Due to the first protrusion portions and the second protrusion portions not easily deforming, the spacing between the first lens and the second lens may be suppressed from being reduced from the set spacing compared to configurations in which the first protrusion portions and the second protrusion portions are offset from each other in the radial direction.

In a lens unit according to a fourth aspect of the present disclosure, the first protrusion portions and the second protrusion portions are arranged alternately along the circumferential direction of the main body when projected along the optical axis direction.

In the lens unit according to the fourth aspect, due to the first protrusion portions and the second protrusion portions being arranged alternately along the circumferential direction of the main body when projected along the optical axis direction, the first protrusion portions or the second protrusion portions are better suppressed from being unevenly distributed at part of the circumferential direction of the main body than in configurations lacking such an alternating arrangement. Due to the first protrusion portions or the second protrusion portions not being disposed unevenly at part of the circumferential direction of the main body, compression force may be dispersed in the circumferential direction of the spacing ring when compression force acts on the spacing ring from the first lens and the second lens.

In a lens unit according to a fifth aspect of the present disclosure, the first protrusion portions and the second protrusion portions are disposed offset with each other in a radial direction of the main body when projected along the optical axis direction.

In the lens unit according to the fifth aspect, due to the first protrusion portions and the second protrusion portions being aligned along the radial direction of the main body when projected along the optical axis direction, compression force may be received at the same circumferential direction positions on the main body.

In a lens unit according to a sixth aspect of the present disclosure, the first protrusion portions and the second protrusion portions are disposed offset with each other in oblique directions intersecting with a circumferential direction of the main body and with a radial direction of the main body when projected along the optical axis direction.

In the lens unit according to the sixth aspect, the first protrusion portions and the second protrusion portions have a diagonal layout due to the first protrusion portions and the second protrusion portions being offset from each other in angled directions. The spacing between the first protrusion portions 44 and the second protrusion portions 46 is accordingly wider than in configurations in which they are offset from each other in one of the circumferential direction or the radial direction. Widening the respective spacings between the first protrusion portions and the second protrusion portions enables compression force to be absorbed by bending elastic force of the main body of the spacing ring, and the first protrusion portions and the second protrusion portions are accordingly not easily deformed. Due to the first protrusion portions and the second protrusion portions not being easily deformed, the spacing between the first lens and the second lens may be suppressed from being reduced from the set spacing compared to configurations in which the first protrusion portions and the second protrusion portions are offset from each other in the radial direction.

In a lens unit according to a seventh aspect of the present disclosure, the second protrusion portions are disposed further to the optical axis side than the first protrusion portions.

In the lens unit according to the seventh aspect, due to the second protrusion portions on the imaging plane side being disposed further to the optical axis side than the first protrusion portions on the object side, the diameter of a virtual circle passing through where the first protrusion portions are disposed is larger than the diameter of a virtual circle passing through where the second protrusion portions are disposed, as viewed along the optical axis direction. Namely, light incident from the object side may be suppressed from being partially blocked by the first protrusion portions on the object side.

In a lens unit according to an eighth aspect of the present disclosure, a gate cut section is formed to the main body when viewed along the optical axis direction; and the first protrusion portions and the second protrusion portions are disposed symmetrically with respect to a virtual line passing through a center of the gate cut section and through a center of the main body when viewed along the optical axis direction.

In the spacing ring formed with the gate cut section, the width of the main body in the radial direction at the gate cut section is narrower than at other locations of the main body. The gate cut section accordingly deforms more readily than the other locations when compression force acts. In the lens unit according to the eighth aspect, the first protrusion portions and the second protrusion portions are disposed symmetrically with respect to the gate cut section on one side and another side of the virtual line. Therefore, the first protrusion portions and the second protrusion portions are not unevenly distributed on the one side or the other side of the virtual line. Due to the first protrusion portions and the second protrusion portions not being unevenly disposed on the main body, compression force may be suppressed from being concentrated at part of the main body compared to configurations in which the first protrusion portions and the second protrusion portions are not symmetrically disposed with respect to the virtual line.

The gate cut section in the present disclosure is not limited to being a configuration in which part of the traces of an introduction section (gate), employed to introduce molten resin into a mold during injection molding of the spacing ring, is left after molding the spacing ring, and includes configurations in which all traces of the gate of the spacing ring have been machined off so as to leave no traces thereof.

In a lens unit according to a ninth aspect of the present disclosure, at least one of the first protrusion portions or the second protrusion portions is disposed on the virtual line.

In the lens unit according to the ninth aspect, due to the at least one of the first protrusion portions or the second protrusion portions being disposed on the virtual line, there is at least one of the first protrusion portions or the second protrusion portions present at the gate cut section, this being a location where the width of the main body is narrow. The gate cut section is reinforced by the presence of the at least one of the first protrusion portions or the second protrusion portions at the gate cut section, enabling deformation of the gate cut section to be suppressed.

In a lens unit according to a tenth aspect of the present disclosure, the first protrusion portions or the second protrusion portions are disposed symmetrically at the gate cut section on one side and another side of the virtual line.

In the lens unit according to the tenth aspect, due to the first protrusion portions or the second protrusion portions being disposed symmetrically at the gate cut section on the one side and the other side of the virtual line, there is no first protrusion portion nor second protrusion portion present on the virtual line at the gate cut section. When compression force acts on the gate cut section, due to there being no first protrusion portion nor second protrusion portion present at the gate cut section, the compression force is absorbed by bending elastic force of the gate cut section, enabling the spacing between the first lens and the second lens to be suppressed from being reduced from the set spacing.

A lens unit according to an eleventh aspect is a lens unit employed onboard a vehicle or employed for surveillance, including the lens unit of any one of the first aspect to the tenth aspect.

The lens units employed onboard a vehicle and employed for surveillance according to the eleventh aspect may be exposed to high temperatures. However, a deterioration in performance of the lens unit may be suppressed in comparison to configurations in which first protrusion portions and second protrusion portions are aligned along the optical axis direction, even when exposed to high temperatures.

Effects of Invention

According to the present disclosure, a lens unit may be provided that is capable of suppressing a reduction in spacing between a first lens and a second lens from a set spacing, in comparison to configurations in which first protrusion portions and second protrusion portions of a spacing ring, sandwiched between the first lens and the second lens, are aligned along the optical axis direction.

DESCRIPTION OF EMBODIMENTS

Description follows regarding examples of embodiments of a lens unit according to the present disclosure. Note that the lens units of the exemplary embodiments are related to lens units to be employed in environments in which it is difficult to maintain image forming performance due to the possibility of being exposed to high temperatures, such as those employed in surveillance cameras and onboard cameras. The lens units of the exemplary embodiments are capable of reducing a deterioration in performance Lens units used for surveillance are provided to buildings and the like, and are lens units for observing objects in their surroundings. Lens units used onboard a vehicle are lens units provided inside the vehicle (i.e., inside a vehicle cabin) to observe objects outside the vehicle.

First Exemplary Embodiment

Figure 1:
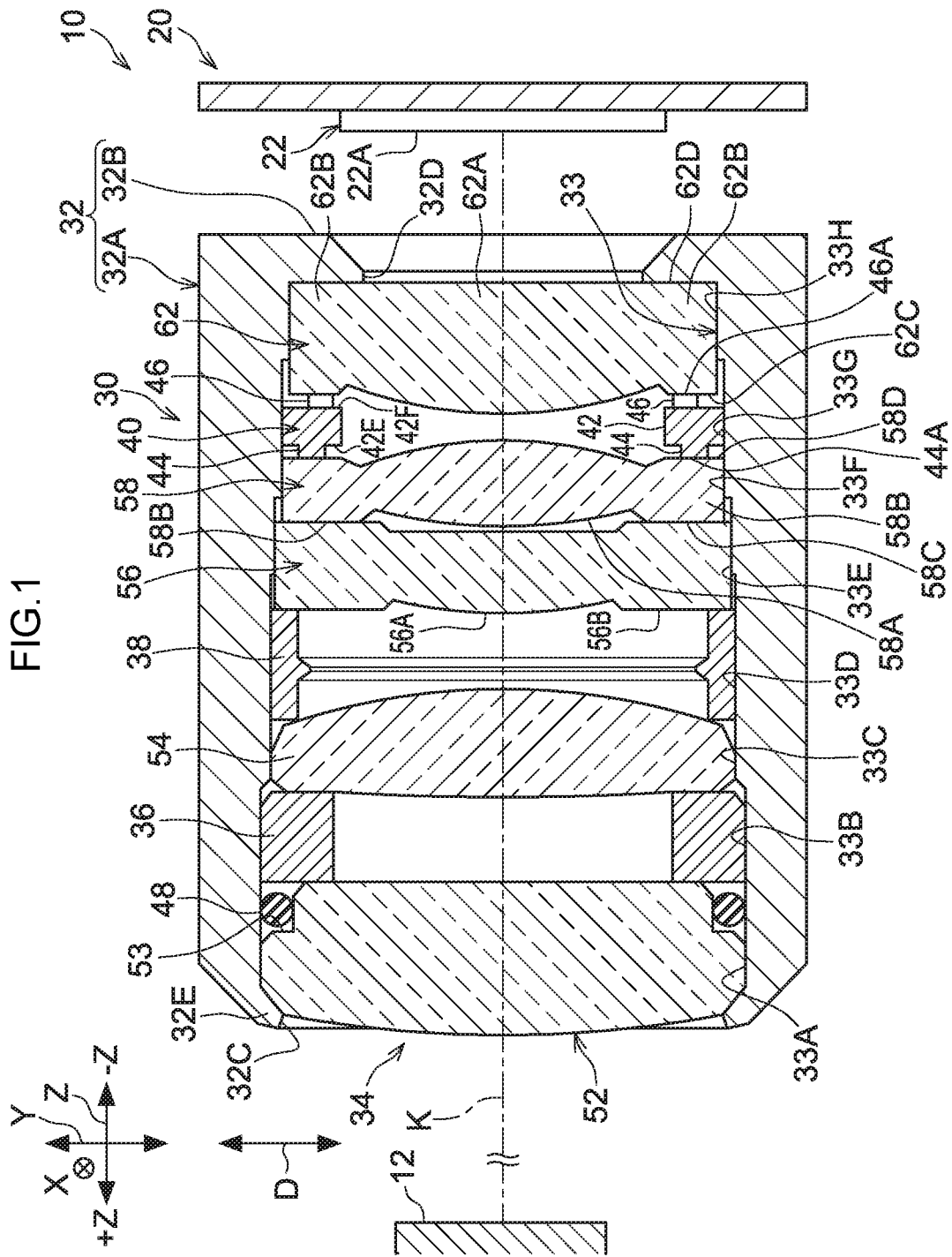
FIG. 1 is an explanatory diagram illustrating an overall configuration of a lens unit and an imaging module according to a first exemplary embodiment.

FIG. 1 illustrates an imaging device 10. The imaging device 10 is, for example, a device that may be employed in an onboard camera. The imaging device 10 includes an imaging module 20 and a lens unit 30. The imaging device 10 uses the lens unit 30 to form an image in the imaging module 20 of an object 12.

Note that in the following description the optical axis direction of light in the lens unit 30 and the center axis direction of a lens-barrel 32, described later, are referred to as the Z direction. Moreover, among radial directions of a lens group 34, described later, of the lens unit 30, which are orthogonal directions orthogonal to the Z direction, one direction is referred to as the Y direction, and the direction orthogonal to the Z direction and the Y direction is referred to as the X direction. The optical axis of light incident to the lens unit 30 from the object side is referred to as K, and is illustrated by a single dotted dashed line or by a dot in the drawings. When simply referring to radial directions without distinguishing between the X direction and the Y direction, this is referred to as the D direction.

Imaging Module

The imaging module 20 includes an imaging element 22, such as a complementary metal oxide semiconductor (CMOS) imaging sensor or a charge coupled device (CCD) imaging sensor. The imaging element 22 is disposed at the focal point of the optical system of the lens unit 30, described later, and includes an imaging face 22A facing the lens unit 30 along the X direction. The imaging face 22A is a face disposed in the X-Y plane. Note that in the following description, the object side in the Z direction is referred to as the +Z side, and the imaging face side is referred to as the −Z side.

The imaging module 20 is supported by a non-illustrated holder attached to the lens unit 30. The imaging module 20 converts light that has arrived through the lens unit 30 into an electrical signal. The converted electrical signal is convertible to analogue or digital image data.

Lens Unit

The lens unit 30 includes, for example, the lens-barrel 32, the lens group 34, a positioning member 36, a positioning member 38, a spacing ring 40, and a seal member 48. The lens group 34, the positioning member 36, the positioning member 38, the spacing ring 40, and the seal member 48 are housed inside the lens-barrel 32.

Lens-Barrel

The lens-barrel 32 illustrated in FIG. 1 is formed in a tubular shape, and is disposed with its center axis direction along the Z direction. Specifically, the lens-barrel 32 includes a barrel section 32A opening in the Z direction, and a bottom wall section 32B covering the barrel section 32A from the −Z side. An opening 32C is formed in a +Z side end of the barrel section 32A. The opening 32C has a circular shape when viewed along the Z direction in a state after heat crimping. An opening 32D is formed so as to pierce through the bottom wall section 32B in the Z direction. The opening 32D has an inner diameter smaller than that of the opening 32C. A housing section 33 is formed by the space from the opening 32C to the opening 32D of the lens-barrel 32, for housing the lens group 34, the positioning member 36, the positioning member 38, the spacing ring 40, and the seal member 48.

The housing section 33 includes, for example, a first housing section 33A, a second housing section 33B, a third housing section 33C, a fourth housing section 33D, a fifth housing section 33E, a sixth housing section 33F, a seventh housing section 33G, and an eighth housing section 33H formed at the inside of the lens-barrel 32, in this sequence from the +Z side toward the −Z side.

A lens 52, described later, and the seal member 48 are housed in the first housing section 33A. The positioning member 36 is housed in the second housing section 33B. A lens 54, described later, is housed in the third housing section 33C. The positioning member 38 is housed in the fourth housing section 33D. A lens 56, described later, is housed in the fifth housing section 33E. A lens 58, described later, is housed in the sixth housing section 33F. The spacing ring 40, described later, is housed in the seventh housing section 33G. A lens 62, described later, is housed in the eighth housing section 33H.

The inner wall of the first housing section 33A, the inner wall of the second housing section 33B, the inner wall of the fourth housing section 33D, and the inner wall of the seventh housing section 33G are, for example, formed in circular shapes as viewed along the Z direction. Although omitted from illustration, an inner diameter da of the second housing section 33B, an inner diameter db of the fourth housing section 33D, and an inner diameter dc of the seventh housing section 33G have a relationship da>db>dc.

The inner wall of the third housing section 33C, the inner wall of the fifth housing section 33E, the inner wall of the sixth housing section 33F, and the inner wall of the eighth housing section 33H are, for example, formed in regular octagonal shapes as viewed along the Z direction. The space inside the third housing section 33C, the space inside the fifth housing section 33E, the space inside the sixth housing section 33F, and the space inside the eighth housing section 33H are progressively smaller, with the space inside the eighth housing section 33H being the smallest space.

The peripheral edge of the opening 32C in the lens-barrel 32 is, for example, bent toward the optical axis K side by heat crimping, thereby configuring a heat crimped portion 32E.

Lens Group

The lens group 34 includes, for example, the lens 52, the lens 54, the lens 56, the lens 58, and the lens 62 disposed in this sequence from the +Z side. The lens 58 is an example of a first lens. The lens 62 is an example of a second lens.

The lens 52 is, for example, made from glass. A step 53 is formed in the lens 52 so as to be indented in the Y direction toward the optical axis K side. The lens 52 has a smaller diameter on the imaging plane side of the step 53 than on the object side thereof, and the seal member 48, described later, is fitted to the imaging plane side of the lens 52. The lens 52 emits light that is incident from the +Z side to the −Z side.

The lens 54 is, for example, made from glass. The lens 54 emits light that is incident from the +Z side to the −Z side. The lens 56 is, for example, made from resin, and includes a lens section 56A, and a peripheral edge 56B jutting out from the lens section 56A in the D direction. The lens 56 emits light that is incident from the +Z side toward the −Z side.

The lens 58 is made from resin, and is equipped with a first lens section 58A and a first flange section 58B. The lens 58 is housed in the sixth housing section 33F of the lens-barrel 32.

The center axis of the first lens section 58A lies along the Z direction and configures the optical axis K. The first lens section 58A is formed in a circular shape as viewed along the Z direction. The first lens section 58A includes respective optical faces (an incident face and an emitting face) on the +Z side and the −Z side.

When viewed along the Z direction, the first flange section 58B juts out from the peripheral edges of the optical faces of the first lens section 58A in the D direction, which is an example of a direction intersecting the Z direction. The first flange section 58B, for example, configures a peripheral edge formed in a ring shape as viewed along the Z direction and having a thickness direction in the Z direction. An end face 58C is formed to the +Z side end of the first flange section 58B. The end face 58C is a flat face formed along a direction orthogonal to the Z direction. An end face 58D is formed to the −Z side end of the first flange section 58B. The end face 58D is a flat face formed along a direction orthogonal to the Z direction. The end face 58C contacts the peripheral edge 56B of the lens 56.

The lens 62 is made from resin, and is equipped with a second lens section 62A and a second flange section 62B. The lens 62 is housed in the eighth housing section 33H of the lens-barrel 32. Namely, the lens 62 is housed on the −Z side of the lens 58.

The center axis of the second lens section 62A lies along the Z direction and configures the optical axis K. The second lens section 62A is formed in a circular shape as viewed along the Z direction. The second lens section 62A includes respective optical faces (an incident face and an emitting face) on the +Z side and the −Z side.

When viewed along the Z direction, the second flange section 62B juts out from the peripheral edges of the optical faces of the second lens section 62A in the D direction, this being an example of a direction intersecting the Z direction. The second flange section 62B, for example, configures a peripheral edge formed in a ring shape as viewed along the Z direction and having a thickness direction in the Z direction. An end face 62C is formed to the +Z side end of the second flange section 62B. The end face 62C is a flat face formed along a direction orthogonal to the Z direction. An end face 62D is formed to the −Z side end of the second flange section 62B. The end face 62D is a flat face formed along a direction orthogonal to the Z direction. The end face 62D contacts an end face on the +Z side of the bottom wall section 32B of the lens-barrel 32.

The positioning member 36 is a ring shaped member when viewed along the Z direction. The positioning member 36 determines the spacing in the Z direction between the lens 52 and the lens 54 due to the Z direction +Z side end face of the positioning member 36 contacting the lens 52, and the −Z side end face thereof contacting the lens 54. The positioning member 38 is a ring shaped member when viewed along the Z direction. The positioning member 38 determines the spacing between the lens 54 and the lens 56 in the Z direction due to the Z direction +Z side end face of the positioning member 38 contacting the lens 54, and the −Z side end face thereof contacting the lens 56.

Spacing Ring

Figure 2:
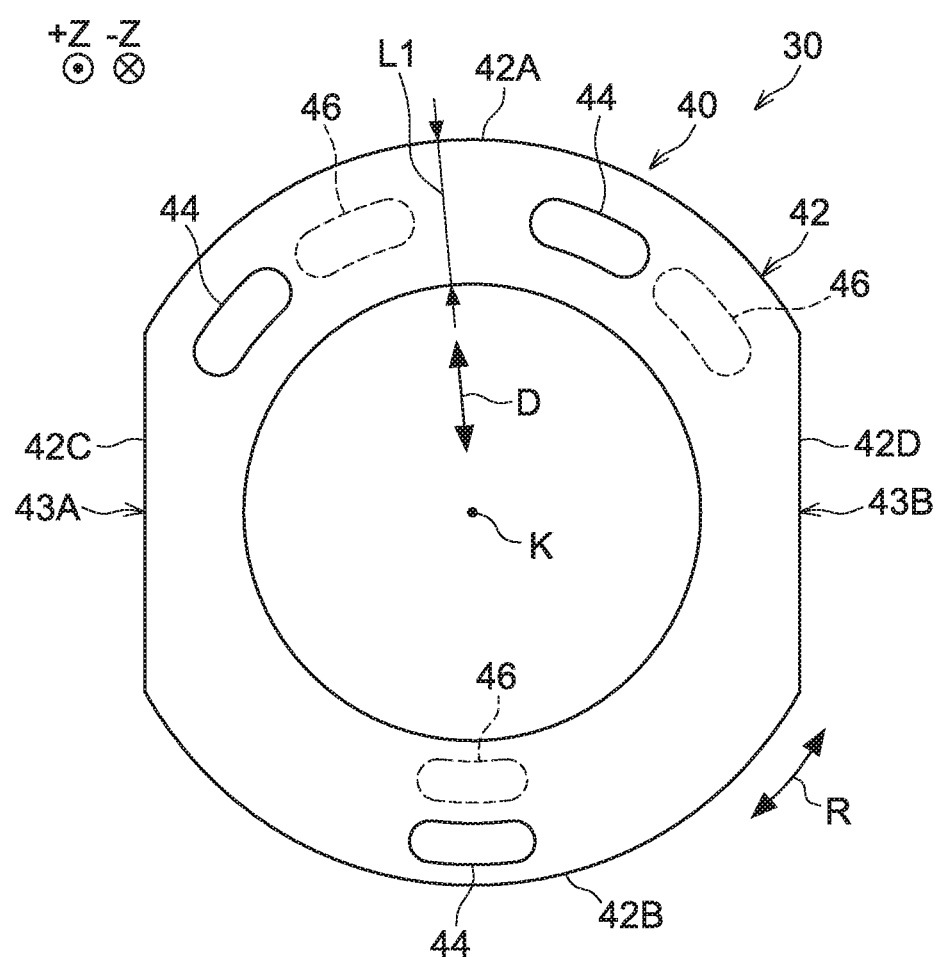
FIG. 2 is a plan view illustrating a spacing ring according to the first exemplary embodiment.

FIG. 2 illustrates the spacing ring 40, in a state viewed along the Z direction from the +Z side. The spacing ring 40 is obtained by pouring a resin material into a non-illustrated mold, letting the resin material harden, then demolding. The spacing ring 40 includes a main body 42, first protrusion portions 44, and second protrusion portions 46. The reason for forming the first protrusion portions 44 and the second protrusion portions 46 on the spacing ring 40 is that if the area of the contact faces on the spacing ring 40 in contact with the lens 58 and the lens 62 is large, then it becomes difficult to raise surface precision. This results in the optical axis K being liable to be skewed. Namely, the first protrusion portions 44 and the second protrusion portions 46 are formed so as to make the area of contact between the spacing ring 40 and the lens 58 and the lens 62 small, thereby raising the surface precision of the contact faces.

Main Body

As viewed along the Z direction, the main body 42 is, for example, formed in a shape in which part of a ring shape is cut away at two locations along two chords. In other words, a gate cut section 43A and a gate cut section 43B are formed to the main body 42 after molding, at two locations along the circumferential direction where D-cuts have been made. Namely, as viewed along the Z direction, the main body 42 includes an outer peripheral face 42A and an outer peripheral face 42B, which are two outer peripheral faces of circular arc shape, and includes a side face 42C and a side face 42D, which have a straight line shape. The gate cut section of the present disclosure are not limited to a configuration in which part of the traces of an introduction section (gate), employed to introduce molten resin into a mold during injection molding of the spacing ring, is left after molding the spacing ring. Namely, the gate cut section includes configurations in which all traces of the gate of the spacing ring have been machined off so as to leave no traces thereof.

The outer peripheral face 42A and the outer peripheral face 42B contact the inner wall face of the seventh housing section 33G of the lens-barrel 32. The side face 42C and the side face 42D do not contact the inner wall face of the seventh housing section 33G of the lens-barrel 32. The circumferential direction of the spacing ring 40 is referred to as the R direction. The length in the R direction at a D direction center of the main body 42 is longer than a widest width L1 of the D direction widths of the main body 42.

The main body 42 illustrated in FIG. 1 is disposed in the Z direction between the first flange section 58B and the second flange section 62B. The thickness of the main body 42 lies along the Z direction. A face of the main body 42 on the +Z side is referred to as an end face 42E, and a face on the −Z side thereof is referred to as an end face 42F. The end face 42E and the end face 42F are examples of faces orthogonal to the Z direction.

First Protrusion Portions

The first protrusion portions 44 are protrusion portions protruding in the Z direction from the end face 42E of the main body 42 toward the +Z side. The first protrusion portions 44 include end faces 44A lying in the X-Y plane. The end faces 44A of first protrusion portions 44 contact the end face 58D of the first flange section 58B.

In the spacing ring 40 illustrated in FIG. 2, there are, for example, three first protrusion portions 44 formed spaced apart from each other along the R direction of the main body 42. Two first protrusion portions 44 of the three first protrusion portions 44 are disposed at a central portion in the D direction width of the main body 42, and one of the first protrusion portions 44 is disposed further to the outside of the central portion in the D direction width thereof. As viewed along the Z direction, the first protrusion portions 44 are formed in circular arc shapes elongated along the R direction.

Second Protrusion Portions

The second protrusion portions 46 illustrated in FIG. 1 are protrusion portions protruding in the Z direction from the end face 42F of the main body 42 toward the −Z side. The second protrusion portions 46 have end faces 46A lying in the X-Y plane. The end faces 46A of the second protrusion portions 46 contact the end face 62C of the second flange section 62B. Namely, the spacing ring 40 determines the spacing in the Z direction between the lens 58 and the lens 62 due to the first protrusion portions 44 contacting the lens 58, and the second protrusion portions 46 contacting the lens 62.

In the spacing ring 40 illustrated in FIG. 2, there are, for example, three second protrusion portions 46 formed spaced apart from each other along the R direction of the main body 42. Two second protrusion portions 46 of the three second protrusion portions 46 are disposed at a central portion in the D direction width of the main body 42, and one of the second protrusion portions 46 is disposed at the optical axis K side of the central portion in the D direction width. As viewed along the Z direction, the second protrusion portions 46 are formed in circular arc shapes elongated along the R direction.

In the spacing ring 40, when the second protrusion portions 46 are projected along the Z direction, the first protrusion portions 44 and the second protrusion portions 46 are disposed so as to be offset from each other along the R direction of the main body 42. Specifically, two first protrusion portions 44 and two second protrusion portions 46 are disposed offset from each other along the R direction of the main body 42. One of the first protrusion portions 44 and one of the second protrusion portions 46 are disposed offset from each other along the D direction of the main body 42.

Seal Member

The seal member 48 illustrated in FIG. 1 is, for example, an O-ring member made from rubber and formed in a ring shape as viewed along the Z direction. In an attached state to the lens 52, the seal member 48 is sandwiched between the lens 52 and the inner wall of the first housing section 33A when the lens 52 is housed in the first housing section 33A, and thereby seals between the lens 52 and the lens-barrel 32.

Lens Unit Assembly

When assembling the lens unit 30, the lens 62, the spacing ring 40, the lens 58, the lens 56, the positioning member 38, the lens 54, the positioning member 36, and the lens 52 including attached seal member 48 are fitted, in this sequence, into the housing section 33 of the lens-barrel 32 from the bottom wall section 32B side, so as to be superimposed on each other along the Z direction. A gap between the lens 52 and the inner wall of the lens-barrel 32 is sealed by the seal member 48 being compressed. The spacing ring 40 defines the spacing between the lens 58 and the lens 62 by being sandwiched between the lens 58 and the lens 62.

After the lens 52 has been housed inside the first housing section 33A, the heat crimped portion 32E of the lens-barrel 32 is bent toward the optical axis K side by heat crimping using a non-illustrated tool. The lens 52 is pressed toward the −Z side by the heat crimped portion 32E. Namely, the lens 52, the positioning member 36, the lens 54, the positioning member 38, the lens 56, the lens 58, the spacing ring 40, and the lens 62 are fixed inside the housing section 33 of the lens-barrel 32 by the heat crimped portion 32E. In an assembled state of the lens unit 30, the optical axis K of the lens group 34 is aligned with the center axis of the barrel section 32A of the lens-barrel 32.

Comparative Example

Figure 13:
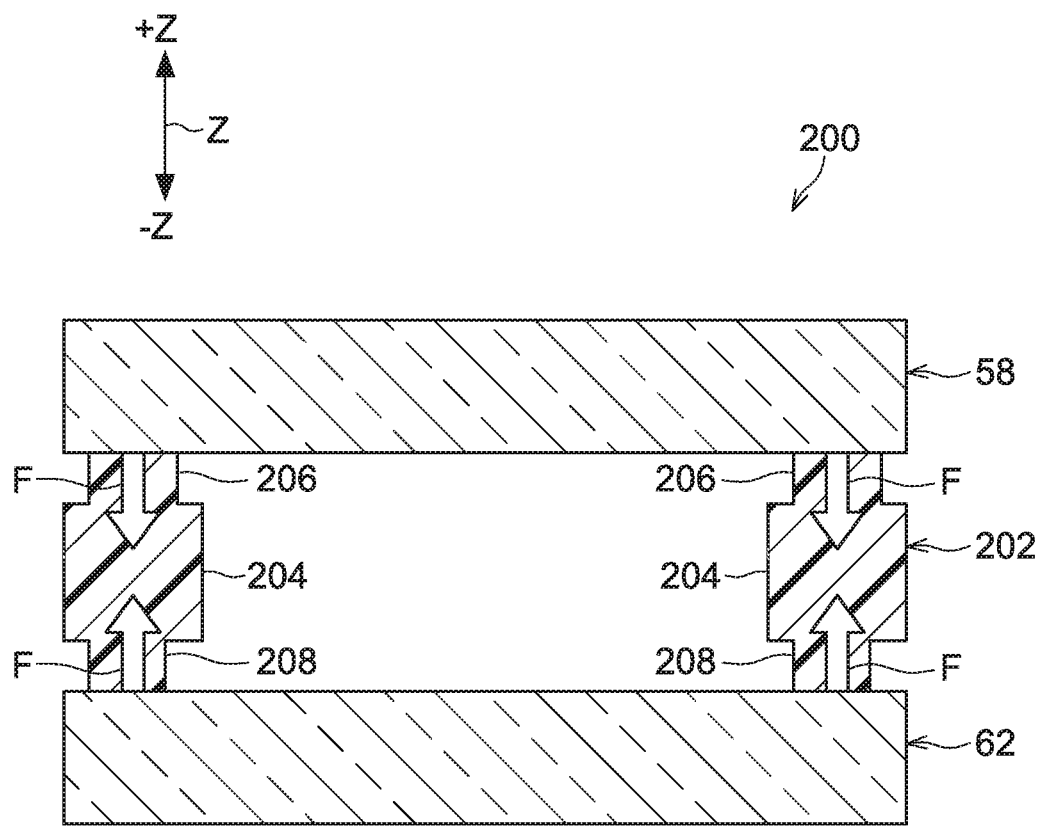
FIG. 13 is an explanatory diagram illustrating a state in which compression force acts on a spacing ring according to a comparative example.

FIG. 13 schematically illustrates part of a lens unit 200 of a comparative example to compare with the lens unit 30 of the present exemplary embodiment. The lens unit 200 of the comparative example is configured by providing a spacing ring 202 to a lens unit 30 of the present exemplary embodiment (see FIG. 1), instead of the spacing ring 40 (see FIG. 1).

The spacing ring 202 of the comparative example is sandwiched along the Z direction between a lens 58 and a lens 62 in a non-illustrated lens-barrel. The spacing ring 202 of the comparative example includes a main body 204 having a ring shape as viewed along the Z direction, first protrusion portions 206 protruding from the +Z side end face of the main body 204 toward the lens 58, and second protrusion portions 208 protruding from the −Z side end face of the main body 204 toward the lens 62. The first protrusion portions 206 and the second protrusion portions 208 are formed at the same locations as each other in both the circumferential direction and the radial direction of the main body 204, so as to be superimposed on each other when projected along the Z direction.

In the lens unit 200 of the comparative example, due to being made of resin, the lens 58 and the lens 62 expand when the lens 58 and the lens 62 have been heated by a rise in the external temperature of the lens unit 200. Due to expansion of the lens 58 and the lens 62 in the Z direction being restricted by the non-illustrated lens-barrel, a compression force F acts on the spacing ring 202 in the Z direction. When the compression force F acts on the spacing ring 202, due to the first protrusion portions 206 and the second protrusion portions 208 being aligned along the Z direction, the compression force F acting on the first protrusion portions 206 from the lens 58 acts toward the second protrusion portions 208. Similarly, the compression force F acting on the second protrusion portions 208 from the lens 62 acts toward the first protrusion portions 206.

Namely, when the first protrusion portions 206 and the second protrusion portions 208 are compressed in the Z direction in the lens unit 200 of the comparative example, the compression force F that arises is not readily absorbed by the spacing ring 202. Due to such compression force F not readily being absorbed by the spacing ring 202, the first protrusion portions 206 and the second protrusion portions 208 undergo plastic deformation. This gives rise to the possibility that the spacing between the lens 58 and the lens 62 in the Z direction is reduced from a pre-set set spacing.

Operation

Description follows regarding the operation of the lens unit 30 of the first exemplary embodiment.

In the lens unit 30 illustrated in FIG. 1, the lens 58, the spacing ring 40, and the lens 62 are housed inside the lens-barrel 32, in this sequence from the object side. In the spacing ring 40, the first protrusion portions 44 protrude from the main body 42 toward the +Z side, and the second protrusion portions 46 protrude from the main body 42 toward the −Z side. The spacing ring 40 defines the spacing between the lens 58 and the lens 62 due to the first protrusion portions 44 contacting the first flange section 58B of the lens 58 in the Z direction, and the second protrusion portions 46 contacting the second flange section 62B of the lens 62 in the Z direction.

In the lens unit 30, the lens 58 and the lens 62 expand when the lens 58 and the lens 62 are heated by a rise in the external temperature of the lens unit 30, due to being made from resin. The expansion of the lens 58 and the lens 62 in the Z direction is restricted by the lens-barrel 32 and, therefore, a compression force acts on the spacing ring 40 in the Z direction.

Figure 3:
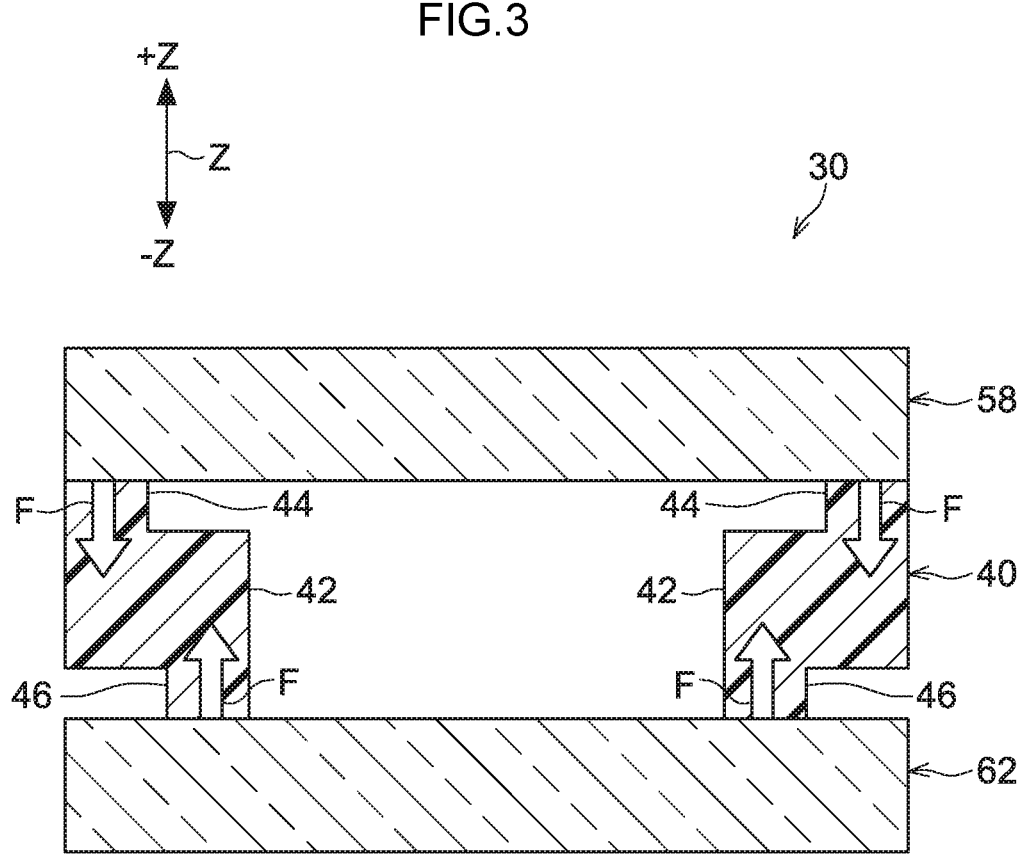
FIG. 3 is an explanatory diagram illustrating a state in which compression force acts on the spacing ring according to the first exemplary embodiment.

FIG. 3 schematically illustrates part of the lens unit 30. In the lens unit 30, due to the first protrusion portions 44 and the second protrusion portions 46 being offset from each other as viewed in a projected state along the Z direction, the compression force F acting on the first protrusion portions 44 from the lens 58 does not readily act toward the second protrusion portions 46. Moreover, the compression force F acting on the second protrusion portions 46 from the lens 62 does not readily act toward the first protrusion portions 44.

Namely, in the lens unit 30, the first protrusion portions 44 and the second protrusion portions 46 are less easily compressed in the Z direction when the lens 58 and the lens 62 have expanded, than in configurations in which the first protrusion portions 44 and the second protrusion portions 46 are aligned along the Z direction. The first protrusion portions 44 and the second protrusion portions 46 are accordingly not easily deformed plastically due to not being easily compressed in the Z direction. This enables the Z direction spacing between the lens 58 and the lens 62 to be suppressed from being reduced from the aforementioned set spacing, compared to the lens unit 200 (see FIG. 13).

Moreover, the lens unit 30 may be employed onboard a vehicle or for surveillance. Although there are occasions when the lens unit 30 employed onboard a vehicle or for surveillance is exposed to high temperatures, the first protrusion portions 44 and the second protrusion portions 46 do not readily compress in the Z direction, and therefore are not easily deformed plastically even when exposed to high temperatures. Namely, the first protrusion portions 44 and the second protrusion portions 46 in the lens unit 30 are not easily deformed plastically even when exposed to high temperatures. This enables a deterioration in performance in the lens unit 30 to be suppressed in comparison to configurations in which first protrusion portions 44 and second protrusion portions 46 are aligned along the optical axis direction.

Figure 4:
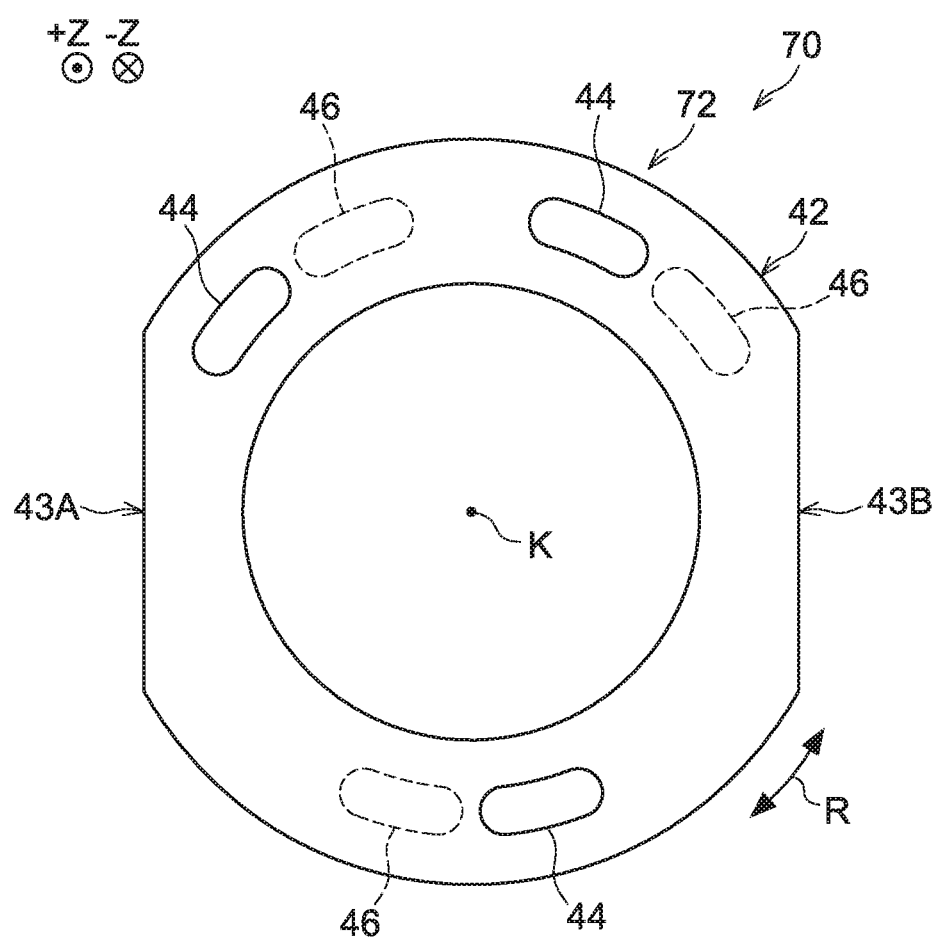
FIG. 4 is a plan view illustrating a spacing ring according to a modified example of the first exemplary embodiment.

FIG. 4 illustrates a lens unit 70 as a modified example of the lens unit 30 (see FIG. 1). The lens unit 70 is configured by replacing the spacing ring 40 (see FIG. 2) in the lens unit 30 with a spacing ring 72. Configuration other than that of the spacing ring 72 is the same as the configuration of the lens unit 30. The spacing ring 72 includes a main body 42, three first protrusion portions 44, and three second protrusion portions 46. Specifically, the first protrusion portions 44 and the second protrusion portions 46 are all arranged in a state respectively offset from each other along the R direction of the main body 42 when the second protrusion portions 46 of the spacing ring 72 are projected in the Z direction.

As viewed along the Z direction, the spacing ring 72 of the lens unit 70 has a length in the R direction longer than a width in the D direction. Namely, offsetting the first protrusion portions 44 and the second protrusion portions 46 from each other along the R direction enables a wider spacing between the respective first protrusion portions 44 and second protrusion portions 46 in a state projected along the Z direction, than configurations in which the first protrusion portions 44 and the second protrusion portions 46 are offset from each other in the D direction. This enables compression force F (see FIG. 3) to be absorbed by a bending elastic force of the main body 42 of the spacing ring 72 due to the wider spacing between the first protrusion portions 44 and the second protrusion portions 46, making deformation of the first protrusion portions 44 and the second protrusion portions 46 not liable to occur. Due to deformation not easily occurring in the first protrusion portions 44 and the second protrusion portions 46, the spacing between the lens 58 and the lens 62 (see FIG. 1) may be suppressed from being reduced from the aforementioned set spacing, compared to configurations in which the first protrusion portions 44 and the second protrusion portions 46 are offset from each other in the D direction.

Second Exemplary Embodiment

Description follows regarding a lens unit 80 of a second exemplary embodiment. Note that the same reference numerals as those of the first exemplary embodiment are appended to configuration the same as that of the first exemplary embodiment, and explanation thereof will be omitted.

Figure 5:
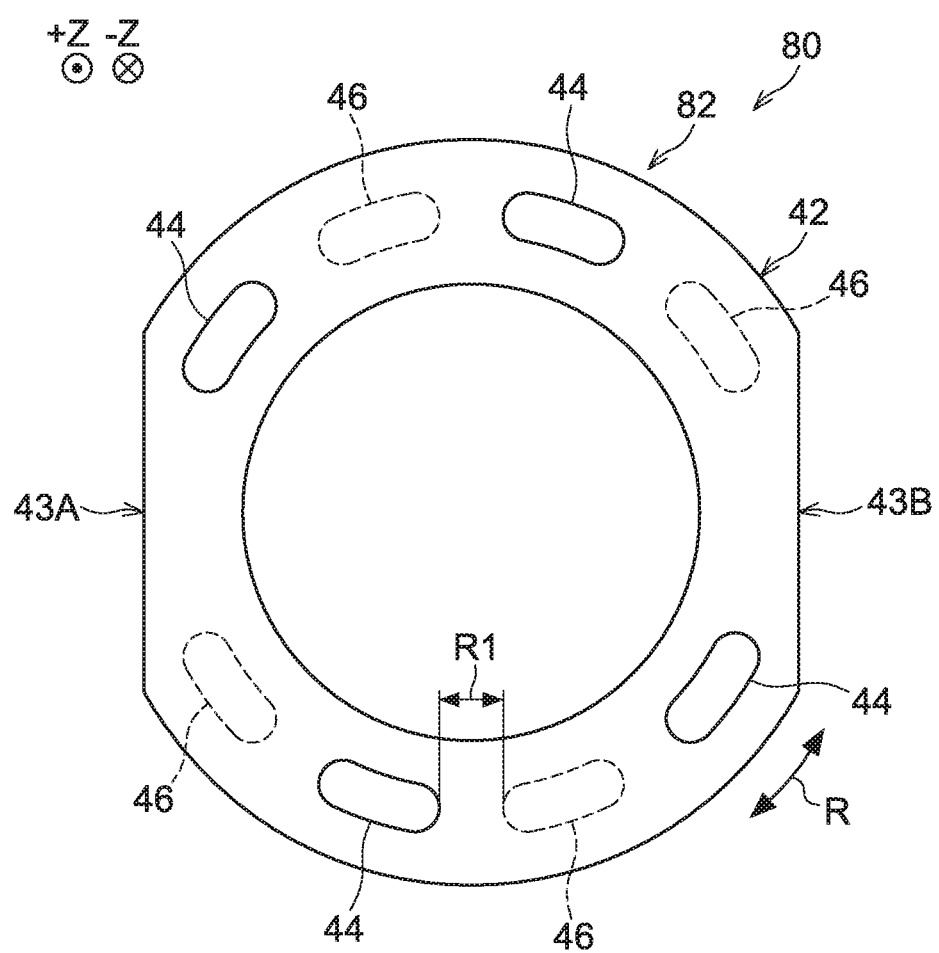
FIG. 5 is a plan view illustrating a spacing ring according to a second exemplary embodiment.

The lens unit 80 illustrated in FIG. 5 is configured by replacing the spacing ring 40 (see FIG. 2) in the lens unit 30 (see FIG. 1) with a spacing ring 82. Configuration other than that of the spacing ring 82 is the same as the lens unit 30.

The spacing ring 82 includes a main body 42, four first protrusion portions 44, and four second protrusion portions 46. Specifically, the first protrusion portions 44 and the second protrusion portions 46 are alternately arranged in a state offset from each other along the R direction of the main body 42 when the second protrusion portions 46 of the spacing ring 82 are projected in the Z direction. Moreover, a spacing R1 along the R direction between adjacent first protrusion portions 44 and second protrusion portions 46 is uniform along the R direction, except for at a gate cut section 43A and at a gate cut section 43B.

Operation

Explanation follows regarding the operation of the lens unit 80 according to the second exemplary embodiment.

In the lens unit 80, the main body 42 of the spacing ring 82 has a longer length along the R direction than width in the D direction. Namely, in the spacing ring 82, due to the first protrusion portions 44 and the second protrusion portions 46 being offset from each other along the R direction when viewed in a state projected along the Z direction, the spacing between the first protrusion portions 44 and the second protrusion portions 46 may be wider in comparison to configurations in which the first protrusion portions 44 and the second protrusion portions 46 are offset from each other in the D direction.

By widening the spacing between the first protrusion portions 44 and the second protrusion portions 46, compression force F (see FIG. 3) may be absorbed by bending elastic force of the main body 42, such that in the spacing ring 82, the first protrusion portions 44 and the second protrusion portions 46 are not easily deformed plastically. Due to the first protrusion portions 44 and the second protrusion portions 46 not being easily deformed plastically, the spacing in the Z direction between the lens 58 and the lens 62 (see FIG. 1) may be suppressed from being reduced from the aforementioned set spacing, in comparison to configurations in which the first protrusion portions 44 and the second protrusion portions 46 are only offset from each other in the D direction.

Moreover, in the lens unit 80, when viewed in a state projected along the Z direction, since the first protrusion portions 44 and the second protrusion portions 46 are arranged alternately along the R direction, uneven distribution of the first protrusion portions 44 or the second protrusion portions 46 at part of the main body 42 along the R direction is suppressed compared to configurations in which they are not arranged alternately. A layout in which the first protrusion portions 44 or the second protrusion portions 46 are not distributed unevenly at part of the main body 42 along the R direction enables the compression force F to be dispersed along the R direction of the spacing ring 82 when compression force F (see FIG. 3) acts from the lens 58 and the lens 62 (see FIG. 1) toward the spacing ring 82.

Third Exemplary Embodiment

Description follows regarding a lens unit 90 of a third exemplary embodiment. Note that the same reference numerals to those of the first exemplary embodiment and the second exemplary embodiment are appended to configuration the same as that of the first exemplary embodiment and the second exemplary embodiment, and explanation thereof will be omitted.

Figure 6:
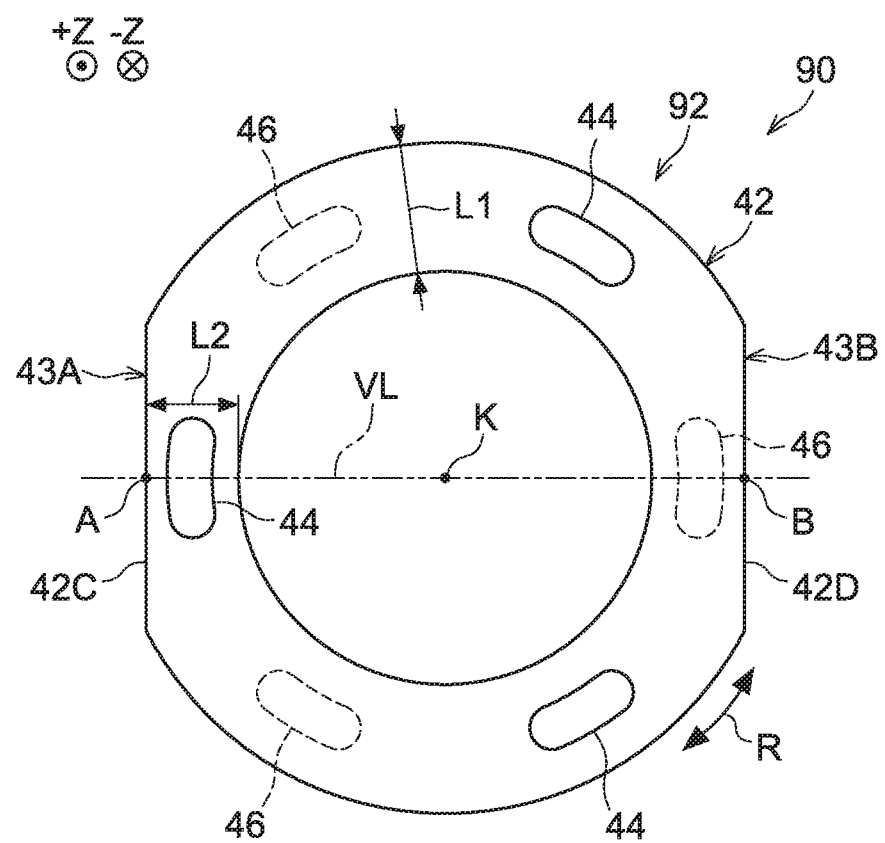
FIG. 6 is a plan view illustrating a spacing ring according to a third exemplary embodiment.

The lens unit 90 illustrated in FIG. 6 is configured by replacing the spacing ring 40 (see FIG. 2) in the lens unit 30 (see FIG. 1) with a spacing ring 92. Configuration other than that of the spacing ring 92 is the same as the lens unit 30. A virtual line VL connects a point A at the center of a side face 42C of a gate cut section 43A and a point B at the center of a side face 42D of a gate cut section 43B and passing through an optical axis K at a central position of a main body 42.

The spacing ring 92 includes the main body 42, three first protrusion portions 44, and three second protrusion portions 46. When the second protrusion portions 46 of the spacing ring 92 are projected in the Z direction, the first protrusion portions 44 and the second protrusion portions 46 are arranged alternately in a offset state from each other along the R direction of the main body 42. When viewed in a state projected in the Z direction, the first protrusion portions 44 and the second protrusion portions 46 are disposed symmetrically about the virtual line VL, with the virtual line VL acting as an axis of symmetry. The symmetrical layout about the virtual line VL includes a configuration having a symmetrical layout in which there is a first protrusion portion 44 or a second protrusion portion 46 disposed on the virtual line VL, with the virtual line VL acting as an axis of symmetry.

Furthermore, one of the first protrusion portions 44 is, for example, disposed at a location of the gate cut section 43A of the spacing ring 92 intersecting with the virtual line VL, this being a location where the width in the D direction is narrowest. One of the second protrusion portions 46 is, for example, disposed at a location of the gate cut section 43B of the spacing ring 92 intersecting with the virtual line VL, this being a location where the width in the D direction is narrowest. Namely, in the spacing ring 92 there are both one first protrusion portion 44 and one second protrusion portion 46 disposed on the virtual line VL.

Operation

Description follows regarding the operation of the lens unit 90 of the third exemplary embodiment.

In the lens unit 90, the first protrusion portions 44 and the second protrusion portions 46 are suppressed from deforming plastically due to being offset from each other when viewed in a state projected along the Z direction. This enables the spacing in the Z direction between the lens 58 and the lens 62 (see FIG. 1) to be suppressed from being reduced from the aforementioned set spacing. The first protrusion portions 44 and the second protrusion portions 46 are also arranged alternately along the R direction in the lens unit 90. This enables compression force F (see FIG. 3) to be dispersed along the R direction of the spacing ring 92 compared to configurations in which these are not alternately arranged.

In the spacing ring 92 of the lens unit 90, a width L2 in the D direction (see FIG. 2) at the gate cut section 43A and the gate cut section 43B of the main body 42 is narrower than a width L1 in the D direction at other locations of the main body 42. Namely, the gate cut section 43A and the gate cut section 43B of the main body 42 more readily deform due to compression force in the Z direction than other locations along the R direction.

However, in the lens unit 90, the first protrusion portions 44 and the second protrusion portions 46 are disposed symmetrically with respect to the gate cut section 43A and the gate cut section 43B, on one side and the other side of the virtual line VL. The symmetrical layout of the first protrusion portions 44 and the second protrusion portions 46 enables the first protrusion portions 44 and the second protrusion portions 46 to be not unevenly distributed on one side or the other side of the virtual line VL. Namely, in the lens unit 90, the first protrusion portions 44 and the second protrusion portions 46 are not unevenly disposed on the main body 42. Due to the first protrusion portions 44 and the second protrusion portions 46 not being unevenly disposed on the main body 42, the compression force F (see FIG. 3) may be suppressed from being concentrated at one portion of the main body 42 compared to configurations in which the first protrusion portions 44 and the second protrusion portions 46 are not disposed symmetrically with respect to the virtual line VL.

Moreover, in the lens unit 90, since one first protrusion portion 44 and one second protrusion portion 46 are disposed on the virtual line VL, there are one first protrusion portion 44 and one second protrusion portion 46 present at the gate cut section 43A and the gate cut section 43B, these being the narrowest locations in the D direction. The gate cut section 43A and the gate cut section 43B are reinforced by the presence of the first protrusion portion 44 and the second protrusion portion 46 at the gate cut section 43A and the gate cut section 43B, enabling deformation of the gate cut section 43A and the gate cut section 43B to be suppressed.

Fourth Exemplary Embodiment

Description follows regarding a lens unit 100 of a fourth exemplary embodiment. The same reference numerals as those of the first exemplary embodiment to the third exemplary embodiment are appended to configuration the same as that of the first exemplary embodiment to the third exemplary embodiment, and explanation thereof will be omitted.

Figure 7:
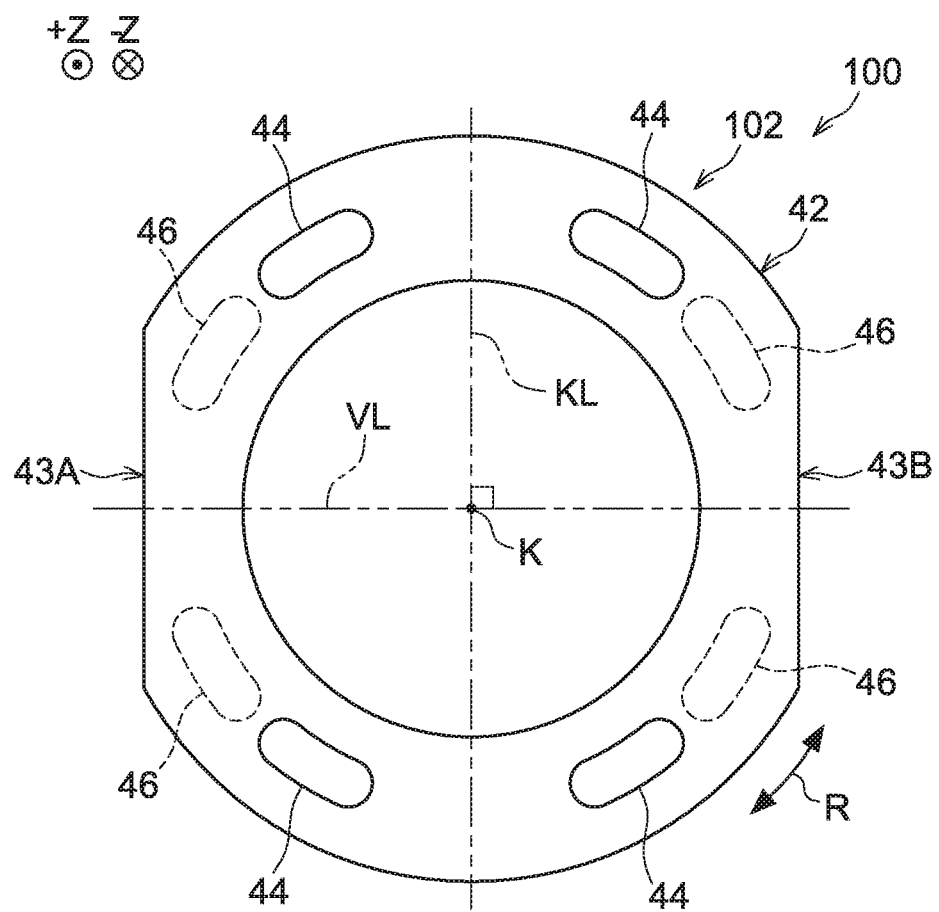
FIG. 7 is a plan view illustrating a spacing ring according to a fourth exemplary embodiment.

The lens unit 100 illustrated in FIG. 7 is configured by replacing the spacing ring 40 (see FIG. 2) of the lens unit 30 (see FIG. 1) with a spacing ring 102. Configuration other than the spacing ring 102 is the same as in the lens unit 30. When the spacing ring 102 is viewed along the Z direction, a virtual line KL is a line passing through an optical axis K and orthogonal to the virtual line VL.

The spacing ring 102 includes a main body 42, four first protrusion portions 44, and four second protrusion portions 46. When the second protrusion portions 46 in the spacing ring 102 are projected along the Z direction, the first protrusion portions 44 and the second protrusion portions 46 are disposed offset from each other along the R direction of the main body 42. Moreover, when viewed in a state projected along the Z direction, the first protrusion portions 44 and the second protrusion portions 46 are symmetrically disposed with respect to the virtual line VL and are symmetrically disposed with respect to the virtual line KL. Moreover, the second protrusion portions 46 are symmetrically disposed so as to be spaced apart from each other on the one side and the other side of the virtual line VL. The first protrusion portions 44 are symmetrically disposed so as to be spaced apart from each other on the one side and the other side of the virtual line KL.

Operation

Description follows regarding the operation of the lens unit 100 of the fourth exemplary embodiment.

In the lens unit 100, the first protrusion portions 44 and the second protrusion portions 46 are disposed offset from each other when viewed in a state projected in the Z direction, thereby suppressing plastic deformation. This enables the spacing in the Z direction between the lens 58 and the lens 62 (see FIG. 1) to be suppressed from being reduced from the aforementioned set spacing. The first protrusion portions 44 and the second protrusion portions 46 are also disposed offset from each other along the R direction in the lens unit 100, enabling compression force F (see FIG. 3) to be dispersed along the R direction of the spacing ring 92.

Furthermore, due to the first protrusion portions 44 and the second protrusion portions 46 being disposed symmetrically with respect to both the virtual line VL and the virtual line KL in the lens unit 100, the compression force F may be suppressed from concentrating at an R direction portion of the spacing ring 102 compared to configurations lacking this symmetrical layout.

In addition, due to the second protrusion portions 46 being symmetrically disposed in the lens unit 100 so as to be spaced apart on the one side and the other side of the virtual line VL, there is no first protrusion portions 44 nor second protrusion portions 46 present on the virtual line VL. When a compression force F (see FIG. 3) acts on the spacing ring 102, due to there being no first protrusion portion 44 or second protrusion portion 46 present at the gate cut section 43A and the gate cut section 43B, the compression force F is absorbed by bending elastic force of the gate cut section 43A and the gate cut section 43B. Namely, in the lens unit 100, the first protrusion portions 44 and the second protrusion portions 46 are suppressed from plastic deformation in the Z direction, enabling the spacing in the Z direction between the lens 58 and the lens 62 to be suppressed from being reduced from the set spacing.

Moreover, due to the first protrusion portions 44 being symmetrically disposed in the lens unit 100 so as to be spaced apart on the one side and the other side of the virtual line KL, there are no first protrusion portions 44 or second protrusion portions 46 present on the virtual line KL. When the compression force F (see FIG. 3) acts on the main body 42, the compression force F is absorbed by plastic deformation at locations of the main body 42 intersecting with the virtual line KL. Namely, due to the first protrusion portions 44 and the second protrusion portions 46 being suppressed from plastically deforming in the Z direction, the spacing in the Z direction between the lens 58 and the lens 62 may be suppressed from being reduced from the set spacing.

Fifth Exemplary Embodiment

Description follows regarding a lens unit 110 of a fifth exemplary embodiment. The same reference numerals to those of the first exemplary embodiment to the fourth exemplary embodiment are appended to configuration the same as that of the first exemplary embodiment to the fourth exemplary embodiment, and explanation thereof will be omitted.

Figure 8:
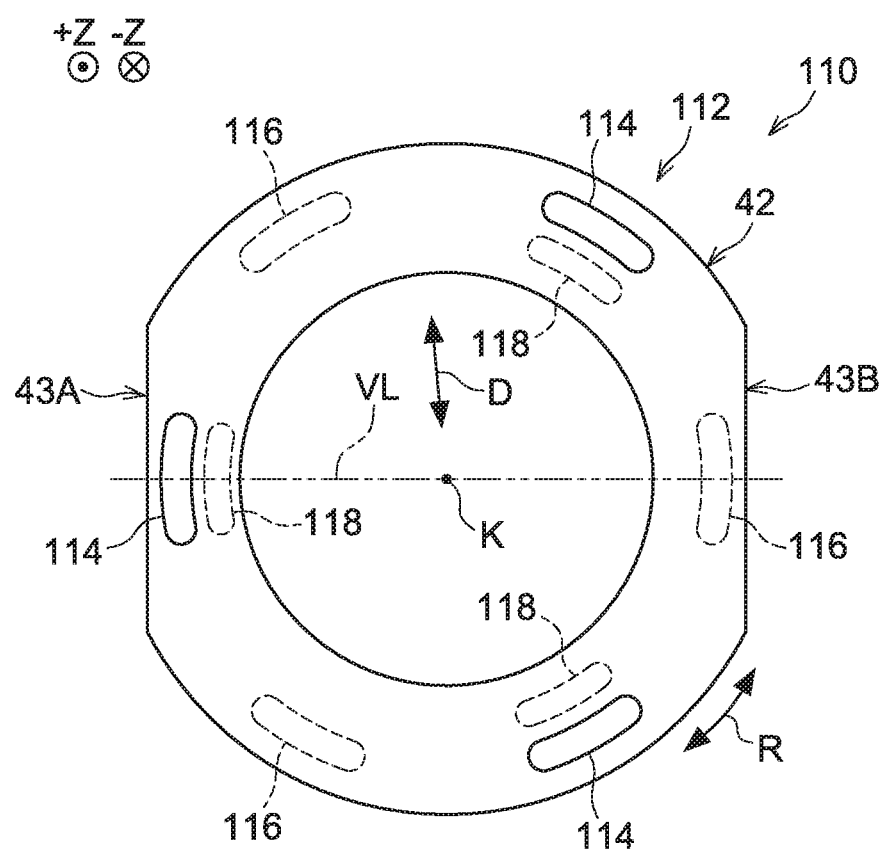
FIG. 8 is a plan view illustrating a spacing ring according to a fifth exemplary embodiment.

The lens unit 110 illustrated in FIG. 8 is configured by replacing the spacing ring 40 (see FIG. 2) in the lens unit 30 (see FIG. 1) with a spacing ring 112. Configuration other than of the spacing ring 112 is the same as in the lens unit 30.

The spacing ring 112 includes a main body 42, three first protrusion portions 114, three second protrusion portions 116, and three third protrusion portions 118.

The first protrusion portions 114 are shaped by narrowing the width and elongating the length in the R direction of the first protrusion portions 44 (see FIG. 2). The height of the first protrusion portions 114 in the Z direction is the same height as that of the first protrusion portions 44. One of the first protrusion portions 114 is symmetrically disposed on the virtual line VL. The other two of the first protrusion portions 114 are disposed offset along the R direction at a pitch forming a center angle of 120° with respect to the first protrusion portion 114 disposed on the virtual line VL.

The second protrusion portions 116 are shaped by narrowing the width and elongating the length in the R direction of the second protrusion portions 46 (see FIG. 2). The second protrusion portions 116 and the first protrusion portions 114 have the same shape and the same size as each other. The height of the second protrusion portions 116 in the Z direction is the same height as that of the second protrusion portions 46. Moreover, the three second protrusion portions 116 are disposed offset along the R direction at a pitch giving center angles of 120°. One of the second protrusion portions 116 is symmetrically disposed on the virtual line VL. The other two of the second protrusion portions 116 are disposed offset along the R direction at a pitch forming a center angle of 120° with respect to the second protrusion portion 116 disposed on the virtual line VL.

The third protrusion portions 118 are formed by narrowing the width of the second protrusion portions 116 and shortening them in the R direction. The height of the third protrusion portions 118 in the Z direction is the same height as that of the second protrusion portions 116. Moreover, the three third protrusion portions 118 are disposed offset along the R direction at a pitch giving center angles of 120°.

In a state in which the second protrusion portions 116 and the third protrusion portions 118 in the lens unit 110 are projected in the Z direction, the three second protrusion portions 116 are disposed so as to face toward the three first protrusion portions 114 in the D direction. Moreover, the three third protrusion portions 118 are disposed further toward the optical axis K side in the D direction than the three first protrusion portions 114. The three first protrusion portions 114, the three second protrusion portions 116, and the three third protrusion portions 118 are disposed symmetrically with respect to the virtual line VL.

Operation

Description follows regarding operation of the lens unit 110 of the fifth exemplary embodiment.

In the spacing ring 112, the first protrusion portions 114 are offset with respect to the second protrusion portions 116 and the third protrusion portions 118 when viewed in a state projected in the Z direction. Due to the first protrusion portions 114 being offset with respect to the second protrusion portions 116 and the third protrusion portions 118, plastic deformation of the first protrusion portions 114, the second protrusion portions 116, and the third protrusion portions 118 is suppressed when a compression force F (see FIG. 3) acts on the spacing ring 112. Due to suppressing plastic deformation of the first protrusion portions 114, the second protrusion portions 116, and the third protrusion portions 118 in the lens unit 110, the spacing in the Z direction between the lens 58 and the lens 62 (see FIG. 1) may be suppressed from being reduced from the aforementioned set spacing.

Moreover, in the lens unit 110, due to the first protrusion portions 114 and the second protrusion portions 116 being offset from each other along the R direction, the compression force F may be dispersed along the R direction of the spacing ring 112. Furthermore, due to the lens unit 110 being configured such that the first protrusion portions 114 and the second protrusion portions 116 are arranged alternately along the R direction, the compression force F (see FIG. 3) may be dispersed along the R direction of the spacing ring 112 compared to configurations in which these are not alternately arranged.

In addition, in the spacing ring 112 of the lens unit 110, in a state in which the first protrusion portions 114 and the third protrusion portions 118 are projected in the Z direction, there are three sets of a first protrusion portion 114 and a third protrusion portion 118 arranged along the D direction of the main body 42. Namely, in a projected state along the Z direction, the first protrusion portions 114 and the second protrusion portions 116 are disposed at the same positions as each other in the R direction of the main body 42, thereby enabling the compression force F (see FIG. 3) to be received at the same position in the R direction of the main body 42.

Moreover, due to the first protrusion portions 114, the second protrusion portions 116, and the third protrusion portions 118 being disposed symmetrically with respect to the virtual line VL in the lens unit 110, the compression force F may be better suppressed from being concentrated at one portion in the R direction of the spacing ring 112 than configurations lacking this symmetrical layout. Furthermore, in the lens unit 110, the third protrusion portions 118 on the −Z side are disposed further toward the optical axis K side than the first protrusion portions 114 on the +Z side. Namely, viewed in a state projected along the Z direction, the diameter of a virtual circle, not illustrated in the drawings, passing through where the first protrusion portions 114 are disposed, is larger than the diameter of a virtual circle, not illustrated in the drawings, passing through where the third protrusion portions 118 are disposed. This enables blocking of part of the light by the first protrusion portions 114 on the +Z side to be suppressed.

Figure 9:
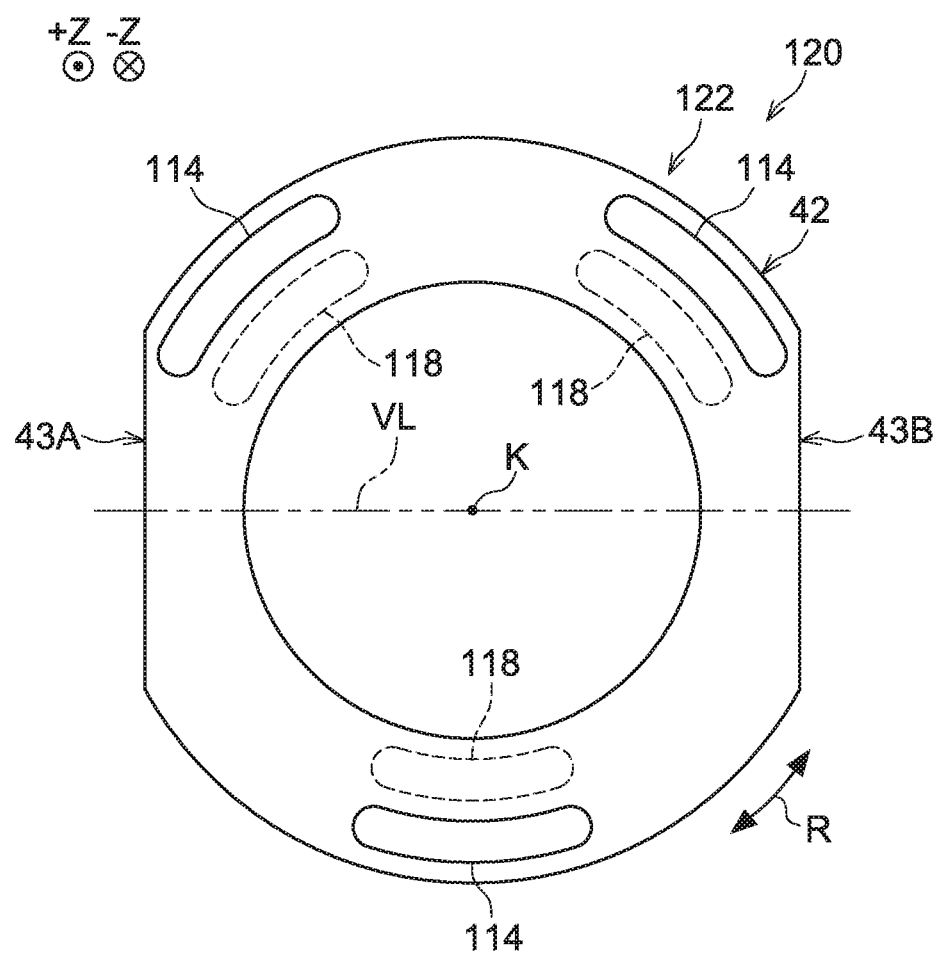
FIG. 9 is a plan view illustrating a spacing ring according to modified example of the fifth exemplary embodiment.

FIG. 9 illustrates a lens unit 120 as a modified example of the lens unit 110 (see FIG. 8). The lens unit 120 is configured by replacing the spacing ring 112 (see FIG. 8) of the lens unit 110 with a spacing ring 122. Configuration other than that of the spacing ring 122 is the same as that of the lens unit 110.

The spacing ring 122 is configured by removing the second protrusion portions 116 (see FIG. 8) from the spacing ring 112 (see FIG. 8), rotating the first protrusion portions 114 and the third protrusion portions 118 in the R direction, and disposing the first protrusion portions 114 and the third protrusion portions 118 asymmetrically with respect to the virtual line VL. In the lens unit 120 as well, when the compression force F (see FIG. 3) acts on the spacing ring 122, the spacing in the Z direction between the lens 58 and the lens 62 (see FIG. 1) may be suppressed from being reduced from the aforementioned set spacing.

Sixth Exemplary Embodiment

Description follows regarding a lens unit 130 of a sixth exemplary embodiment. The same reference numerals to those of the first exemplary embodiment to the fifth exemplary embodiment are appended to configuration the same as that of the first exemplary embodiment to the fifth exemplary embodiment, and explanation thereof will be omitted.

Figure 10:
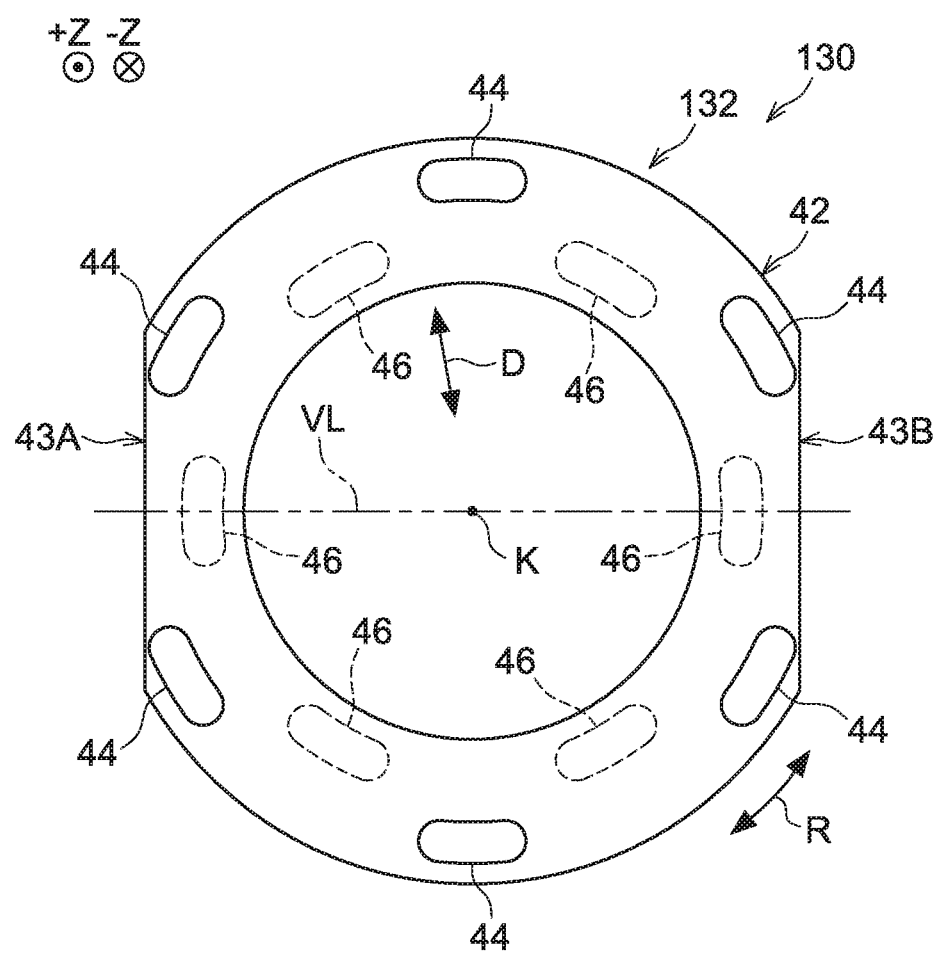
FIG. 10 is a plan view illustrating a spacing ring according to a sixth exemplary embodiment.

The lens unit 130 illustrated in FIG. 10 is configured by replacing the spacing ring 40 (see FIG. 2) of the lens unit 30 (see FIG. 1) with a spacing ring 132. Configuration other than that of the spacing ring 132 is the same as that of the lens unit 30.

The spacing ring 132 includes a main body 42, six first protrusion portions 44, and six second protrusion portions 46.

The six first protrusion portions 44 are disposed so as to be offset along the R direction at a pitch giving center angles of 60°. None of the six first protrusion portions 44 is disposed on a virtual line VL. The six first protrusion portions 44 are disposed on a single non-illustrated virtual circle further to the outside than a D direction center of the main body 42.

The six second protrusion portions 46 are disposed so as to be offset along the R direction at a pitch giving center angles of 60°. Two second protrusion portions 46 of the six second protrusion portions 46 are disposed on the virtual line VL. Furthermore, the six second protrusion portions 46 are disposed on a single non-illustrated virtual circle on an optical axis K side of the D direction center of the main body 42.

In a state in which the six second protrusion portions 46 are projected in the Z direction, the six second protrusion portions 46 and the six first protrusion portions 44 are offset from each other in both the D direction and the R direction. Namely, when projected in the Z direction, the six first protrusion portions 44 and the six second protrusion portions 46 are disposed so as to be respectively offset from each other in oblique directions that intersect the R direction of the main body 42 and intersect the D direction.

Operation

Description follows regarding operation of the lens unit 130 of the sixth exemplary embodiment.

In the lens unit 130, the first protrusion portions 44 and the second protrusion portions 46 are offset from each other in oblique directions that intersect with both the D direction and the R direction. Namely, the first protrusion portions 44 and the second protrusion portions 46 have a diagonal layout and, therefore, the spacing between the first protrusion portions 44 and the second protrusion portions 46 is wider than in configurations in which they are offset from each other in only one of the R direction or the D direction. Due to making the respective spacings wider between the first protrusion portions 44 and the second protrusion portions 46, the compression force F (see FIG. 3) may be absorbed by bending elastic force of the main body 42 of the spacing ring 132, so that deformation does not easily occur in the first protrusion portions 44 and the second protrusion portions 46. Due to the first protrusion portions 44 and the second protrusion portions 46 not being easily deformed, the spacing in the Z direction between the lens 58 and the lens 62 (see FIG. 1) may be suppressed from being reduced from the aforementioned set spacing compared to configurations in which the first protrusion portions 44 and the second protrusion portions 46 are offset from each other in only one of the R direction or the D direction.

Figure 11:
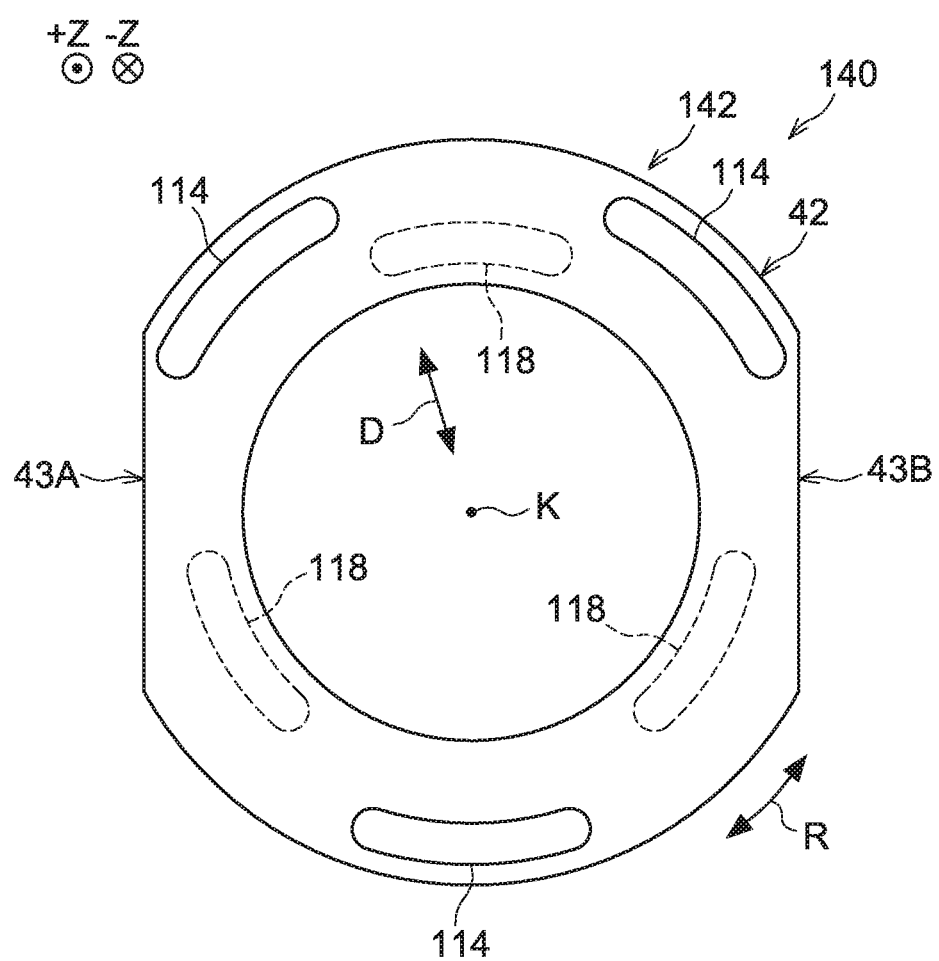
FIG. 11 is a plan view illustrating a spacing ring according to a modified example of the sixth exemplary embodiment.

FIG. 11 illustrates a lens unit 140 as a modified example of the lens unit 130 (see FIG. 10). The lens unit 140 is configured by replacing the spacing ring 132 (see FIG. 10) of the lens unit 130 with a spacing ring 142. Configuration other than that of the spacing ring 142 is the same as that of the lens unit 130.

The spacing ring 142 includes a main body 42, three first protrusion portions 114, and three third protrusion portions 118.

The three first protrusion portions 114 are disposed so as to be offset from each other along the R direction at a pitch giving center angles of 120°. The three first protrusion portions 114 are disposed on a non-illustrated virtual circle further to the outside than the D direction center of the main body 42.

The three third protrusion portions 118 are disposed offset from each other along the R direction at a pitch giving center angles of 120°. The three third protrusion portions 118 are disposed on a non-illustrated virtual circle on an optical axis K side of the D direction center of the main body 42.

In a state in which the three third protrusion portions 118 are projected in the Z direction, the three first protrusion portions 114 and the three third protrusion portions 118 are offset with respect to each other in both the D direction and the R direction. Namely, when projected in the Z direction, the three first protrusion portions 114 and the three third protrusion portions 118 are disposed in oblique directions intersecting with the R direction and with the D direction of the main body 42. In the lens unit 130 as well, when the compression force F (see FIG. 3) acts on the spacing ring 142, the spacing in the Z direction between the lens 58 and the lens 62 (see FIG. 1) may be suppressed from being reduced from the aforementioned set spacing.

Note that the present disclosure is not limited to the exemplary embodiments described above.

Figure 12:
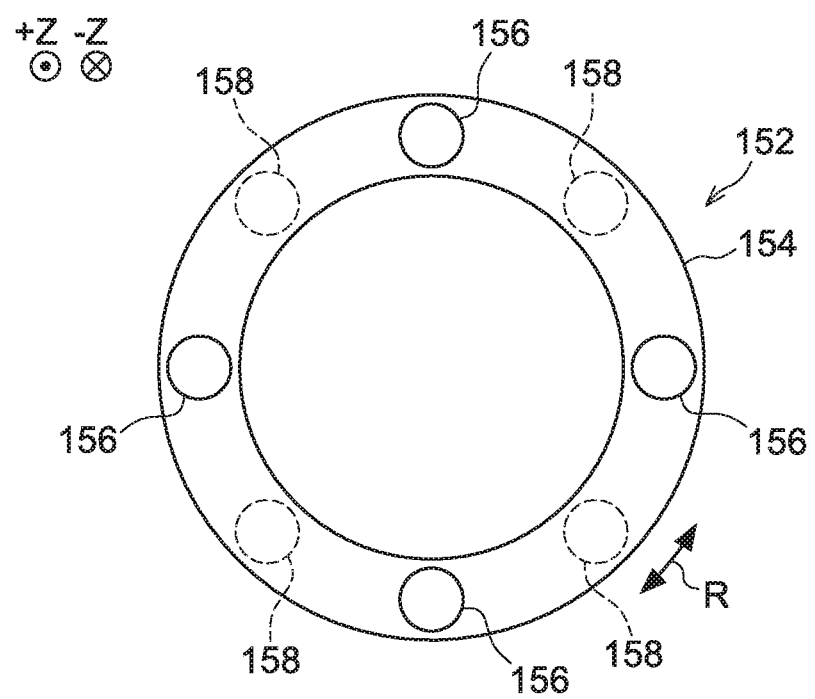
FIG. 12 is a plan view of a spacing ring according to another modified example, as viewed from an object side.

FIG. 12 illustrates a spacing ring 152 as another modified example. When viewed in a projected state along the Z direction, the spacing ring 152 includes a ring shaped main body 154, four first protrusion portions 156, and four second protrusion portions 158.

The four first protrusion portions 156 are protrusion portions formed with circular plate shapes protruding from the main body 154 toward the +Z side, and are disposed along the R direction at a pitch giving center angles of 90°. The four second protrusion portions 158 are protrusion portions formed with circular plate shapes protruding from the main body 154 toward the −Z side, and are disposed along the R direction at a pitch giving center angles of 90°. The four first protrusion portions 156 and the four second protrusion portions 158 are disposed so as to be offset from each other by 45° along the R direction. In the lens unit provided with the spacing ring 152 as well, when the compression force F (see FIG. 3) acts on the spacing ring 152, the spacing in the Z direction between the lens 58 and the lens 62 (see FIG. 1) may be suppressed from being reduced from the aforementioned set spacing.

The shape of the main body of the spacing ring is not limited to a shape that, when viewed along the Z direction, forms a ring shape with gate cut sections, and may be a polygonal shape. Moreover, the main body may have a width in the D direction that is wider, than at other locations, only at the locations where the first protrusion portions or the second protrusion portions are formed.

The shapes of the first protrusion portions and the second protrusion portions are not limited to circular arc shapes or circular shapes when viewed along the Z direction, and may be polygonal shapes. The shape of the first protrusion portions and the shape of the second protrusion portions may be different from each other. Moreover, the height of the first protrusion portions in the Z direction, and the height of the second protrusion portions in the Z direction may be different from each other.

The number of first protrusion portions along the R direction may be any plural number of three or more. The number of first protrusion portions along the D direction may be one, or may be any plural number of two or more. The number of second protrusion portions along the R direction may be any plural number of three or more. The number of second protrusion portions along the D direction may be one, or may be any plural number of two or more.

The optical system of the lens unit is not limited to the lens group 34 including five lenses, and may be configured by a single lens, or by any plural number of two or more lenses. The number of spacing rings is not limited to one, and there may be any plural number of two or more spacing rings provided. Moreover, the number of seal members 48 is not limited to one, and there be any plural number of two or more seal members provided.

The lens 52 and the lens 54 may be made from resin. The lens 56 may be made from glass. One or more of the lens 58 or the lens 62 may be made from glass. If a thermal expansion coefficient of lenses made from resin is denoted by a, a thermal expansion coefficient of spacing rings made from resin is denoted by β, and a thermal expansion coefficient of lenses made from glass is denoted by γ, then α>β>γ. Namely, in cases in which a spacing ring made from resin sandwiched between a pair of glass lenses is heated, the first protrusion portions and the second protrusion portions attempt to plastically deform due to expansion of the spacing ring itself. However, due to the first protrusion portions and the second protrusion portions not being aligned along the optical axis direction, plastic deformation of the first protrusion portions and the second protrusion portions may be suppressed.

In the lens unit there may, as well as lenses and spacing rings, also be an aperture member or a light-blocking plate provided. The aperture member or light-blocking plate may, for example, be disposed between at least one of the spacing ring and the first lens, or between the spacing ring and the second lens.

The spacing ring 92 of the lens unit 90 may be configured such that just one of the first protrusion portions 44, or just one of the second protrusion portions 46, is be disposed on the virtual line VL. The first protrusion portions and the second protrusion portions may be swapped over in the lens units 30, 70, 80, 90, 100, 110, 120, 130, 140.

In the spacing ring 132 of the lens unit 130, the second protrusion portions 46 may be disposed symmetrically about the virtual line VL.

The lens-barrel 32 or the spacing rings 40, 72, 82, 92, 102, 112, 122, 132, 142, 152 may, for example, be configured from polyphenylene sulfide containing glass fibers and inorganic filler. Making the lens-barrel or the spacing rings from a fiber reinforced plastic containing glass fibers or the like raises the mechanical strength thereof. Examples of resins that may be employed include at least one type of resin selected from the group consisting of a polyamide, a polyacetal, a polycarbonate, a polyphenylene ether, a polybutylene terephthalate, a polyethylene terephthalate, a polyethylene, a syndiotactic polystyrene, a polysulfone, a polyethersulfphone, a polyphenylene sulfide, a polyarylate, a polyamide-imide, a polyetherimide, a polyetheretherketone, an acrylonitrile butadiene styrene, a polyolefin, and a modified polymer of any of these resins. The resin may also be a polymer alloy containing at least one resin selected from this group. Fibers that may be employed include glass fibers and carbon fibers, a fiber reinforced plastic, an inorganic filler or the like may be employed.

The above resin materials such as fiber reinforced plastic may contain glass fibers, carbon fibers, inorganic fillers, or the like as required. Making the lens-barrel or the spacing rings from a fiber reinforced plastic containing glass fibers or the like enables a lens-barrel or spacing ring to be obtained that has a higher mechanical strength.

Note that the lens-barrel needs to have high light-blocking properties and light-absorbing properties. The resin employed therefor is preferably black in color, and the above resin materials preferably contain a black pigment or black colorant. Configuring the lens-barrel from a resin material containing a black pigment or black colorant enables the inner wall face of the lens-barrel to be made black in color, thereby enabling more effective suppression of visible light from being reflected at the inner wall face of the lens-barrel.

The invention claimed is:

1. A lens unit comprising:
   a first lens that is housed inside a lens-barrel, the first lens comprising a first lens section and a first flange section that juts out from the first lens section in a direction orthogonal to an optical axis direction;
   a second lens that is housed inside the lens-barrel further toward an imaging plane side than the first lens, the second lens comprising a second lens section and a second flange section that juts out from the second lens section in the direction orthogonal to the optical axis direction; and a spacing ring that is sandwiched between the first lens and the second lens and that defines a spacing between the first lens and the second lens, the spacing ring comprising a main body disposed between the first flange section and the second flange section in the optical axis direction, a plurality of first protrusion portions that protrude in the optical axis direction from an object side of the main body, and a plurality of second protrusion portions that protrude in the optical axis direction from the imaging plane side of the main body and are disposed offset with respect to the first protrusion portions when projected along the optical axis direction, wherein a gate cut section is formed as a straight line cut to the main body when viewed along the optical axis direction;

wherein the first protrusion portions and the second protrusion portions are disposed symmetrically with respect to a virtual line passing through a center of the gate cut section and through a center of the main body when viewed along the optical axis direction;

wherein the first protrusion portions and the second protrusion portions are disposed offset with each other in oblique directions intersecting with a circumferential direction of the main body and with a radial direction of the main body when projected along the optical axis direction;

wherein the second protrusion portions have a profile narrower in width along a radial direction of the first protrusion portions and shorter in length along the circumferential direction than the first protrusion portions;

wherein the main body is formed in a ring shape when viewed along the optical axis direction, and comprises two gate cut sections having profiles cut away from the main body along two parallel chords that are symmetrical to each other about the optical axis; and wherein the main body contacts the lens-barrel at an outer peripheral face of the main body excluding where the gate cut sections are present.

2. The lens unit of claim 1, wherein at least one of the first lens or the second lens is made from resin.

3. The lens unit of claim 1, wherein the first protrusion portions and the second protrusion portions are arranged alternately along the circumferential direction of the main body when projected along the optical axis direction.

4. The lens unit of claim 1, wherein the second protrusion portions are disposed further to an optical axis side than the first protrusion portions.

5. The lens unit of claim 1, wherein at least one of the first protrusion portions or the second protrusion portions is disposed on the virtual line.

6. The lens unit of claim 1, wherein the first protrusion portions or the second protrusion portions are disposed symmetrically at the gate cut section on one side and another side of the virtual line.

7. The lens unit of claim 1, wherein the spacing ring further comprises a third protrusion portion having a profile narrower in width along a radial direction of the second protrusion portions and shorter in length along the circumferential direction than the second protrusion portions, the third protrusion portion being disposed further to the optical axis direction side than the first protrusion portions.

8. A lens unit employed onboard a vehicle or employed for surveillance, comprising the lens unit of claim 1.

* * * * *